(12) United States Patent
Blanchet et al.

(10) Patent No.: US 11,196,060 B2
(45) Date of Patent: Dec. 7, 2021

(54) FUEL CELL STACK WITH INTEGRATED PROCESS ENDPLATES

(71) Applicant: Nuvera Fuel Cells, LLC, Billerica, MA (US)

(72) Inventors: Scott C. Blanchet, Chelmsford, MA (US); Benjamin Lunt, Tewksbury, MA (US)

(73) Assignee: NUVERA FUEL CELLS, LLC, Billerica, MA (US)

( * ) Notice: Subject to any disclaimer, the term of this patent is extended or adjusted under 35 U.S.C. 154(b) by 257 days.

(21) Appl. No.: 16/103,401

(22) Filed: Aug. 14, 2018

(65) Prior Publication Data

US 2019/0006684 A1    Jan. 3, 2019

Related U.S. Application Data

(62) Division of application No. 12/489,403, filed on Jun. 22, 2009, now abandoned.

(60) Provisional application No. 61/074,819, filed on Jun. 23, 2008.

(51) Int. Cl.

| | |
|---|---|
| *H01M 8/2475* | (2016.01) |
| *H01M 8/04089* | (2016.01) |
| *H01M 8/2457* | (2016.01) |
| *H01M 8/2483* | (2016.01) |
| *H01M 8/0263* | (2016.01) |
| *H01M 8/0267* | (2016.01) |
| *H01M 8/0247* | (2016.01) |
| *H01M 8/04119* | (2016.01) |
| *H01M 8/241* | (2016.01) |

(52) U.S. Cl.
CPC ..... *H01M 8/04097* (2013.01); *H01M 8/0247* (2013.01); *H01M 8/0263* (2013.01); *H01M 8/0267* (2013.01); *H01M 8/04164* (2013.01); *H01M 8/2415* (2013.01); *H01M 8/2457* (2016.02); *H01M 8/2475* (2013.01); *H01M 8/2483* (2016.02)

(58) Field of Classification Search
CPC .......... H01M 8/0258; H01M 8/04104; H01M 8/04097; H01M 8/2457
See application file for complete search history.

(56) References Cited

U.S. PATENT DOCUMENTS

| | | |
|---|---|---|
| 3,982,961 A | 9/1976 | Grasso |
| 5,013,617 A | 5/1991 | Scheffler |
| 5,045,414 A | 9/1991 | Bushnell et al. |
| 5,200,279 A | 4/1993 | Draper et al. |
| 5,382,478 A | 1/1995 | Chow et al. |
| 5,419,980 A | 5/1995 | Okamoto et al. |
| 5,441,821 A | 8/1995 | Merritt et al. |
| 5,484,666 A | 1/1996 | Gibb et al. |
| 5,547,776 A | 8/1996 | Fletcher et al. |
| 6,436,562 B1 | 8/2002 | DuBose |
| 6,503,650 B1 | 1/2003 | Yasuo et al. |
| 6,708,712 B2 | 3/2004 | Wakeman |

(Continued)

FOREIGN PATENT DOCUMENTS

| | | | | |
|---|---|---|---|---|
| WO | WO-2005117181 A1 | * | 12/2005 | ........ H01M 8/04201 |
| WO | WO 2006/100029 A1 | | 9/2006 | |

*Primary Examiner* — Edward J. Schmiedel
(74) *Attorney, Agent, or Firm* — Finnegan, Henderson, Farabow, Garrett & Dunner, LLP (57) ABSTRACT

This disclosure related to polymer electrolyte member fuel cells and components thereof, including fuel cell endplates.

5 Claims, 9 Drawing Sheets

(56) References Cited

U.S. PATENT DOCUMENTS

| | | |
|---|---|---|
| 6,855,442 B2 | 2/2005 | Katagiri et al. |
| 6,902,840 B2 | 6/2005 | Blanchet et al. |
| 8,057,942 B2 | 11/2011 | Machuca et al. |
| 8,202,639 B2 | 6/2012 | Olsommer et al. |
| 2002/0094469 A1* | 7/2002 | Yoshizumi .......... H01M 8/0662 |
| | | 429/411 |
| 2004/0005491 A1 | 1/2004 | Blanchet et al. |
| 2006/0115694 A1* | 6/2006 | Igarashi ............ H01M 8/04589 |
| | | 429/431 |
| 2006/0157131 A1 | 7/2006 | Harris et al. |
| 2008/0199746 A1* | 8/2008 | Kobayashi ........ H01M 8/04097 |
| | | 429/430 |
| 2008/0241631 A1* | 10/2008 | Norimatsu ........ H01M 8/04208 |
| | | 429/446 |
| 2009/0104480 A1 | 4/2009 | Machuca et al. |
| 2010/0040930 A1 | 2/2010 | Delfino et al. |
| 2010/0310956 A1 | 12/2010 | Olsommer et al. |

\* cited by examiner

FUEL CELL STACK WITH INTEGRATED PROCESS ENDPLATES

CROSS REFERENCES TO RELATED APPLICATION

This application is a divisional application of U.S. application Ser. No. 12/459,403, filed Jun. 22, 2009, which claims the benefit of U.S. Provisional Application No. 61/074,819, filed Jun. 23, 2008.

TECHNICAL FIELD

The present disclosure is directed in general to the field of polymer electrolyte membrane fuel cells.

BACKGROUND

Fuel cell endplates are plates installed at two ends of a fuel cell or a fuel cell stack. They use mechanical fastening means, such as tie rods, to apply an appropriate pressure to the fuel cells to ensure proper contact between adjacent fuel cell components, making seals to avoid fluid leakages and enabling good electrical conductivity. Endplates are often made of metal or plastic materials.

SUMMARY

This disclosure provides a fuel cell system that comprises a fuel cell stack having conduits for anode feed gas, anode exhaust, cathode feed gas, and cathode exhaust. The fuel cell stack comprises an endplate, which comprises a first fluid channel connected to the conduit for anode feed gas and a second fluid channel connected to the conduit for anode exhaust.

The system further comprises a fluid handling component affixed to the endplate. The component can be a valve, a pump, a gas blower, a gas ejector, etc. The gas ejector can have a Venturi tube or an orifice plate, a motive gas inlet, a suction gas inlet, and a gas mixture outlet for venting a mixture of the first motive gas and the suction gas. In certain embodiments according to this disclosure, the motive gas inlet can be fluidly connected to a source of a fuel gas, the suction gas inlet can be fluidly connected to the conduit for anode exhaust gas, and the gas mixture outlet can be fluidly connected to the conduit for anode feed gas.

In one embodiment, the gas ejector further comprises a piston and a spring. The piston has a piston disk connected to a valve stem. The spring exerts a first force on one side of the piston, and the mixture of the motive gas and the suction gas exerts a second force on the other side of the piston disk. When the second force is lower than the first force, the piston opens the motive gas inlet to introduce the motive gas into the ejector.

In another embodiment, the fuel cell stack may comprise a conduit for an incoming coolant and a conduit for an exiting coolant. In such an embodiment, the endplate may further comprise a fluid channel connected to the conduit for the incoming coolant and a fluid channel connected to the conduit for the exiting coolant.

The fluid channels can either be straight channels inside the endplate or may be one that traverse an extended length inside the endplate, for example, as a serpentine channel.

The present disclosure also provides a method for circulating an anode exhaust into a fuel cell stack by fluidly connecting the motive gas inlet of a gas ejector to a source of fuel gas, fluidly connecting the gas mixture outlet of the gas ejector to a conduit for anode feed gas in a fuel cell, and fluidly connecting the suction gas inlet of the gas ejector to a conduit for anode exhaust in a fuel cell. During the operation of the fuel cell stack, as the anode gas pressure decreases, the gas ejector is triggered to open. The fuel gas acts as a motive gas to allow the anode exhaust gas to flow into the ejector and mix with the fuel gas to replenish the anode gas.

DETAILED DESCRIPTIONS

A fuel cell stack has built-in fluid conduits, including conduits for anode feed gas, anode exhaust, cathode feed gas, and cathode exhaust. As disclosed herein, the endplate for the fuel cell stack comprises built-in fluid channels that connect to the built-in fluid conduits in the stack to form fluid passages. Furthermore, the endplate also comprises built-in ports that receive gas-handling system components, such as valves. These ports can be directly mounted on the built-in fluid channels in the endplate to reduce external plumbing.

Figure 1:
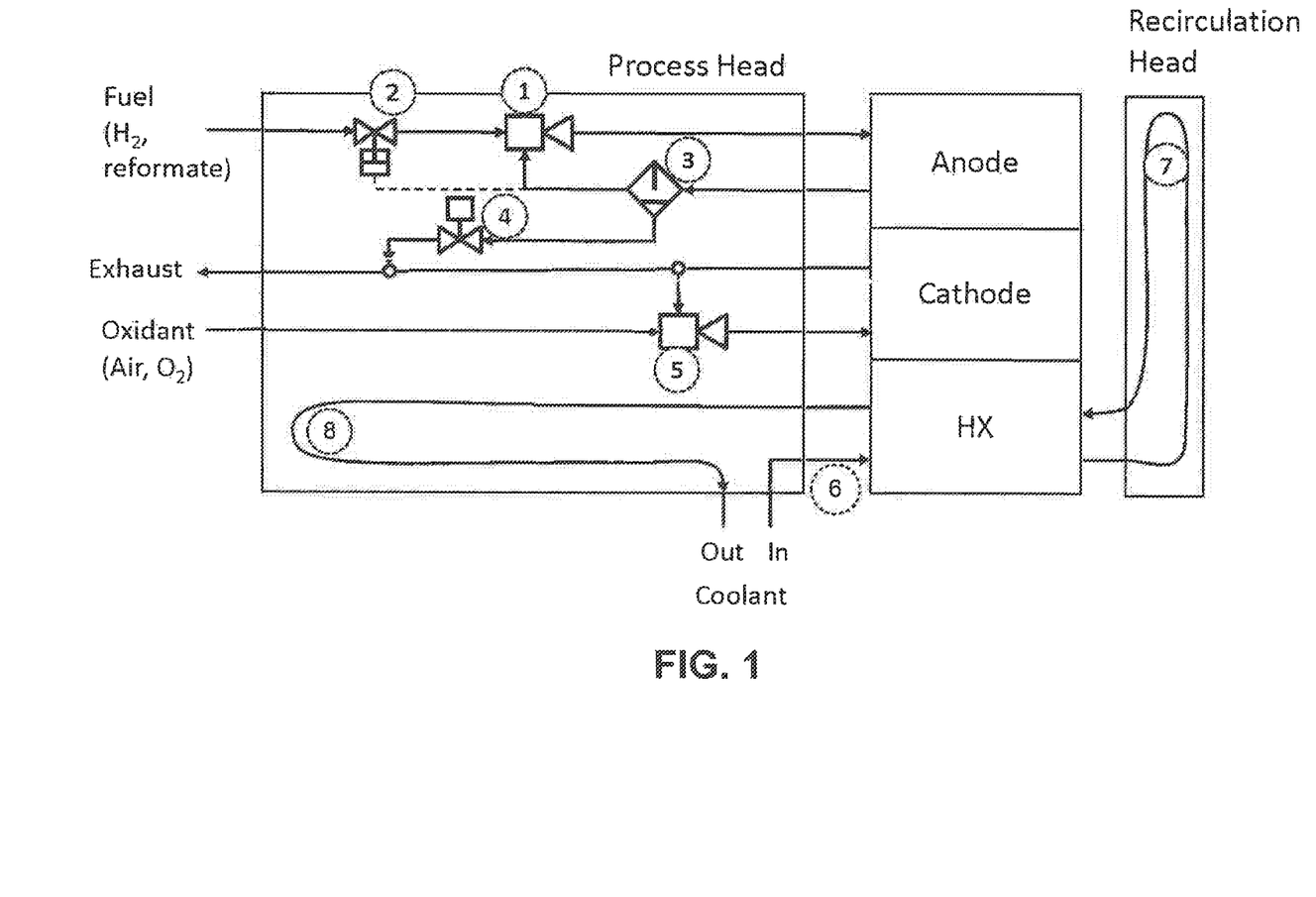
FIG. 1 is a schematic illustration of an embodiment of a fuel cell system according to this disclosure.

FIG. 1 is a schematic illustration for one of the embodiments of the fuel cell system according this disclosure. There are two endplates in this embodiment, one labeled "Process Head" and the other "Recirculation Head." The fuel cell stack between the Process Head and the Recirculation Head comprises an anode, a cathode, and a component designated as "HX." This component HX functions as a heat exchanger that provides heat to or removes heat from the fuel cell. The component HX can be a cooling cell having a coolant passing through.

The Process Head comprises multiple fluid channels, for example, channels for anode feed gas, anode exhaust, cathode feed gas, and cathode exhaust. In the embodiment of FIG. 1, the anode feed gas comprises a fuel gas, which can be, for example, dry hydrogen, humidified hydrogen, reformate from a fuel reformer, etc. It also comprises anode exhaust from the fuel cell anode. The anode exhaust is mixed with the fuel gas to form the anode feed gas.

In this embodiment, the fuel gas is connected to an ejector (1) through a pressure control valve (2). The anode exhaust exits the anode compartment and enters the Process Head into an anode water separator (3), in which it splits into two streams. The gas stream, which is removed of liquid water, enters the ejector (1) and mixes with fuel gas. The mixture of the anode exhaust and the fuel gas from the ejector (1) is sent to the anode compartment as the anode feed gas. The other stream, which contains liquid water, is connected to an anode purge control valve (4). The purge control valve (4) opens periodically to allow purging of water and/or inert gases in the anode exhaust stream.

In the system according to FIG. 1, the anode pressure control valve (2) has a set pressure that references the pressure of the anode exhaust stream from the anode water separator (3). When the reference pressure drops below a set point, the control valve opens, introducing anode feed gas to the fuel cell stack until the anode exhaust pressure reaches the set point.

The Process Head also comprises at least one channel for an oxidant gas that is the feed gas to the cathode. The oxidant gas from a gas source flows into the Process Head, passes the cathode liquid/gas recirculation eductor (5), then enters the cathode compartment of the fuel cell. The cathode exhaust also enters the Process Head. The passage of the cathode exhaust inside the Process Head, however, is connected to an eductor (5), in which a portion of the cathode exhaust is mixed with the oxidant gas to form a cathode feed gas to the cathode of the fuel cell.

The Process Head also comprises at least one channel for the coolant fluid. Depending on the operating conditions and/or system requirement, it may be preferable to keep the temperature of the Process Head closer to the temperature of the incoming coolant or to the temperature of the exiting coolant. For example, in the embodiment according to FIG. 1, the length of the coolant inlet (6) inside the Process Head is made shorter than that of the coolant outlet (8) inside the Process Head, for instance, by keeping it as a straight channel inside the Process Head. While the coolant outlet (8) inside the Process Head may traverse a significant area of the Process Head, for instance, in a serpentine flow channel inside the Process Head, which lengthens the channel for the coolant outlet (8). This feature can allow enhanced heat exchange between the exiting coolant flow and the Process Head, thereby bringing the temperature of the Process Head closer to the temperature of the exiting coolant.

If it is desirable to make the temperature of the Process Head closer to that of the incoming coolant, the coolant outlet (8) can be made shorter, e.g., by making it a straight channel, while the coolant inlet (6) may traverse an extended length inside the Process Head. For instance, the coolant inlet (6) may be have many be have many curves or turns, for example, as in a serpentine channel. Such an arrangement can allow enhanced heat exchange between the incoming flow and the Process Head, thereby bringing the temperature of the Process Head closer to that of the incoming coolant.

Likewise, both the coolant inlet (6) and the coolant outlet (8) may traverse an extended length inside the Process Head. In this arrangement, the incoming coolant and the exiting coolant can have significant heat exchange between themselves in the Process Head so that their temperatures may become more uniform.

Another aspect of the embodiment according to FIG. 1 is that the coolant passage (7) in the Recirculation Head can be made to traverse an extended length inside the Recirculation Head. This arrangement may supply heat to the Recirculation Head so that its temperature can be brought closer to the temperature of the fuel cell stack. Passing the coolant through the Recirculation Head may also help dissipating reaction heat from the fuel cell stack.

On the other hand, the Recirculation Head may not have a coolant passage so that no coolant passes through the Recirculation Head. This may help preserving heat inside the fuel cell stack.

The fluid channels are created inside the Process Head and/or the Recirculation Head by machining, molding, casting, metal injection molding, sintered metal processes, or other manufacturing methods that are generally known in the art. The balance of plant components, i.e., system components such as valves (2), (4), ejector (1), and eductor (5), may be directly mounted on the Process Head into their designated ports.

FIGS. 2-6 illustrate alternative embodiments of the fuel cell system with integrated process endplates. Identical components in different figures have the same designation.

Figure 2:
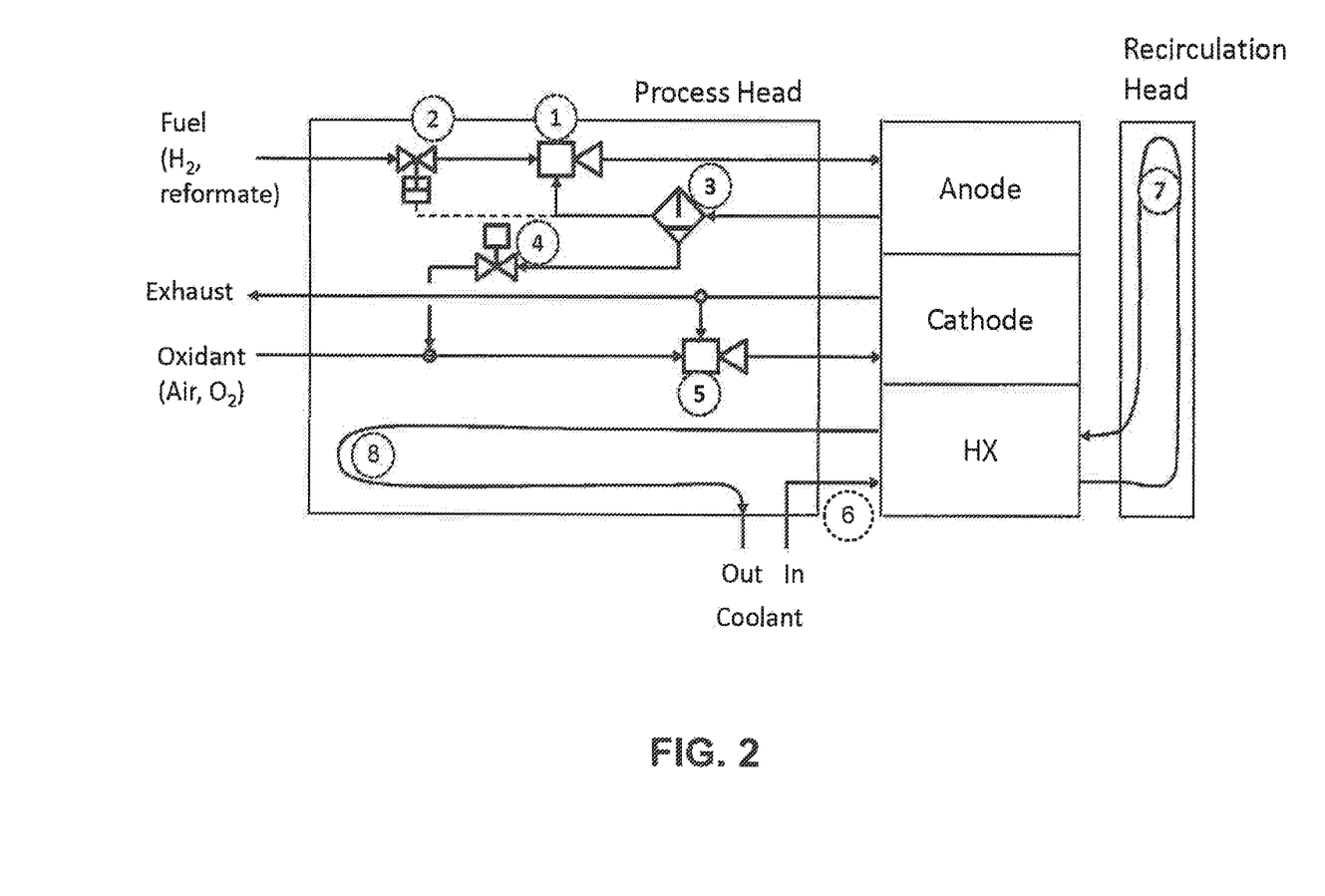
FIG. 2 is a schematic illustration of an embodiment of a fuel cell system according to this disclosure.
Figure 3:
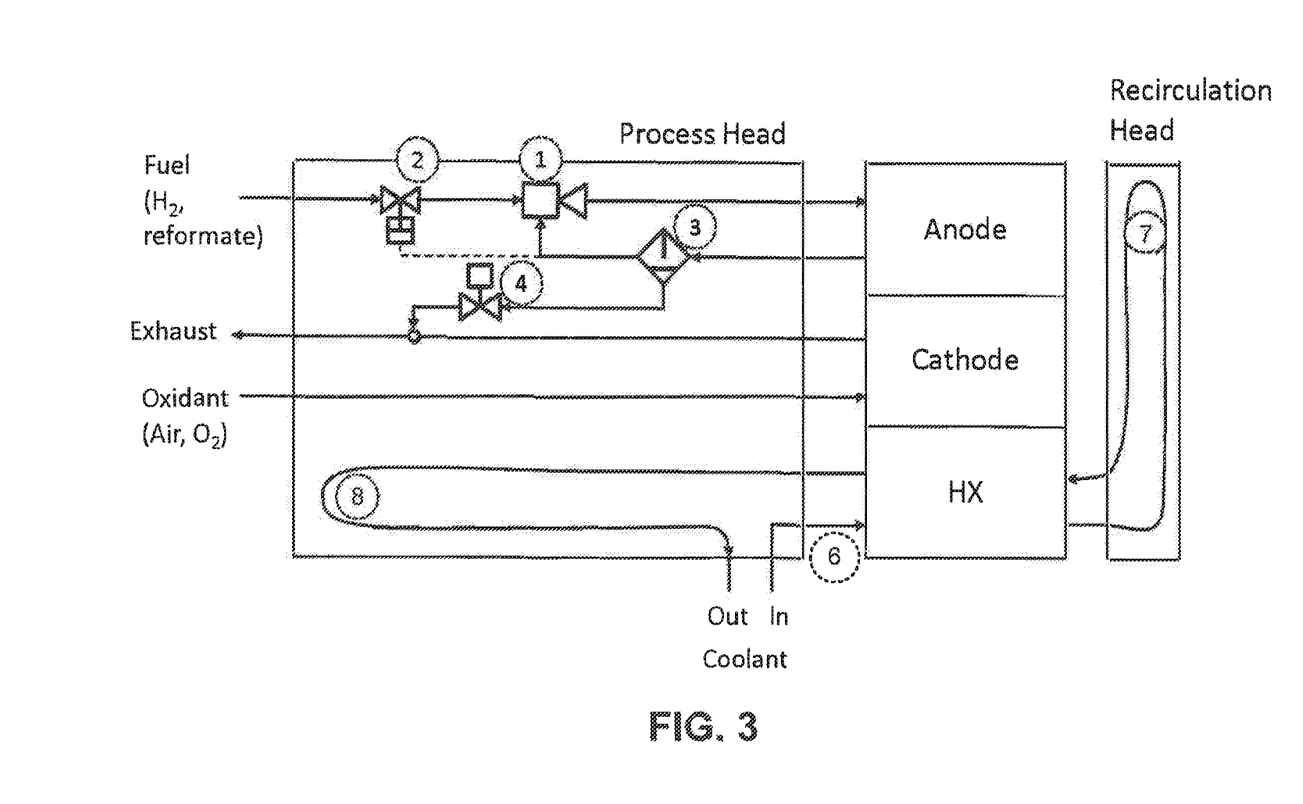
FIG. 3 is a schematic illustration of an embodiment of a fuel cell system according to this disclosure.

The embodiment in FIG. 2 differs from the embodiment in FIG. 1 in that the water from the water separator (3) is allowed to mix with the oxidant gas to provide humidification. The system of FIG. 3 differs from the system of FIG. 1 in that it does not recirculate the cathode exhaust to the fuel cell stack. Rather, the system of FIG. 3 directly vents the cathode exhaust.

Figure 4:
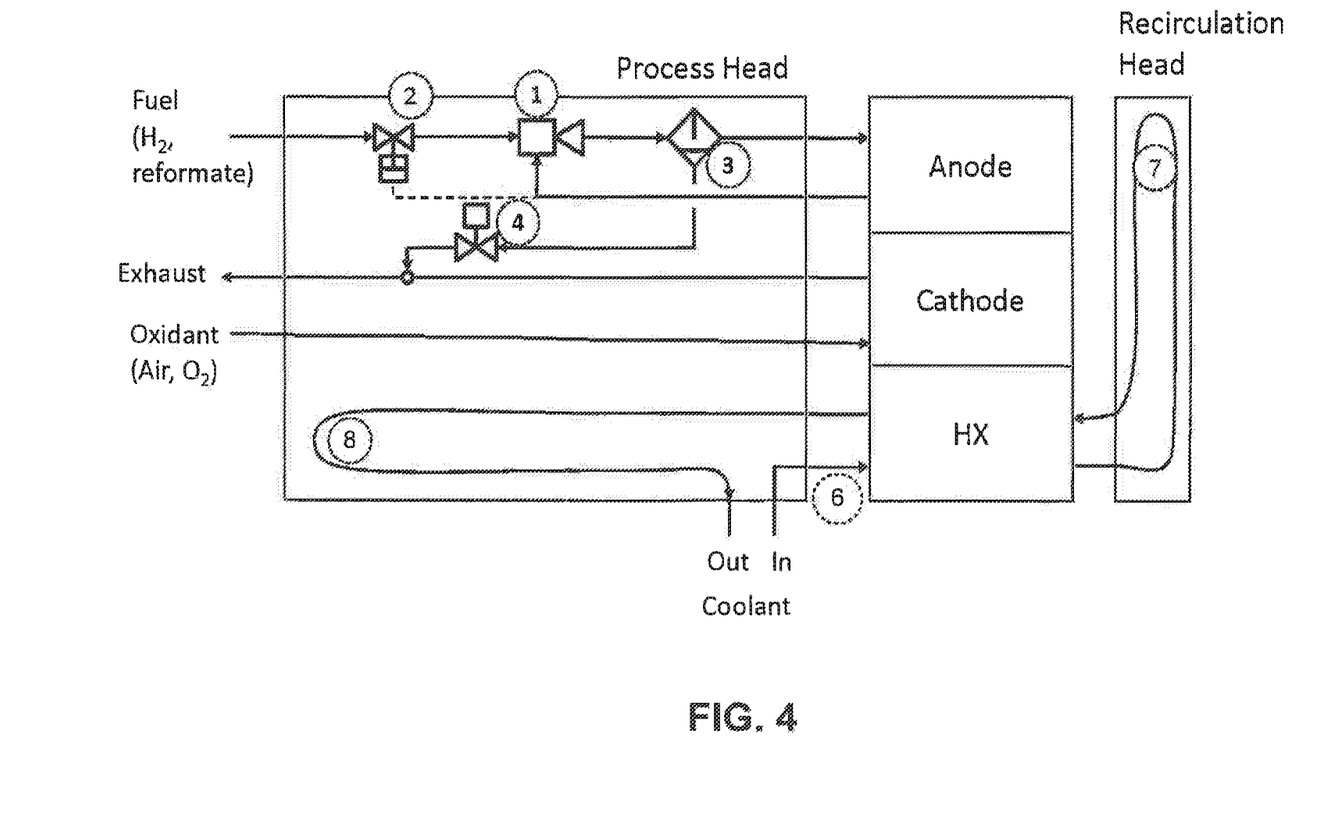
FIG. 4 is a schematic illustration of an embodiment of a fuel cell system according to this disclosure.

The embodiment in FIG. 4 does not provide cathode gas recirculation. In addition, the water separator is installed in the channel to the anode of the fuel cell. Accordingly, the control valve (2) references the anode exhaust pressure from the fuel cell anode directly.

Figure 5:
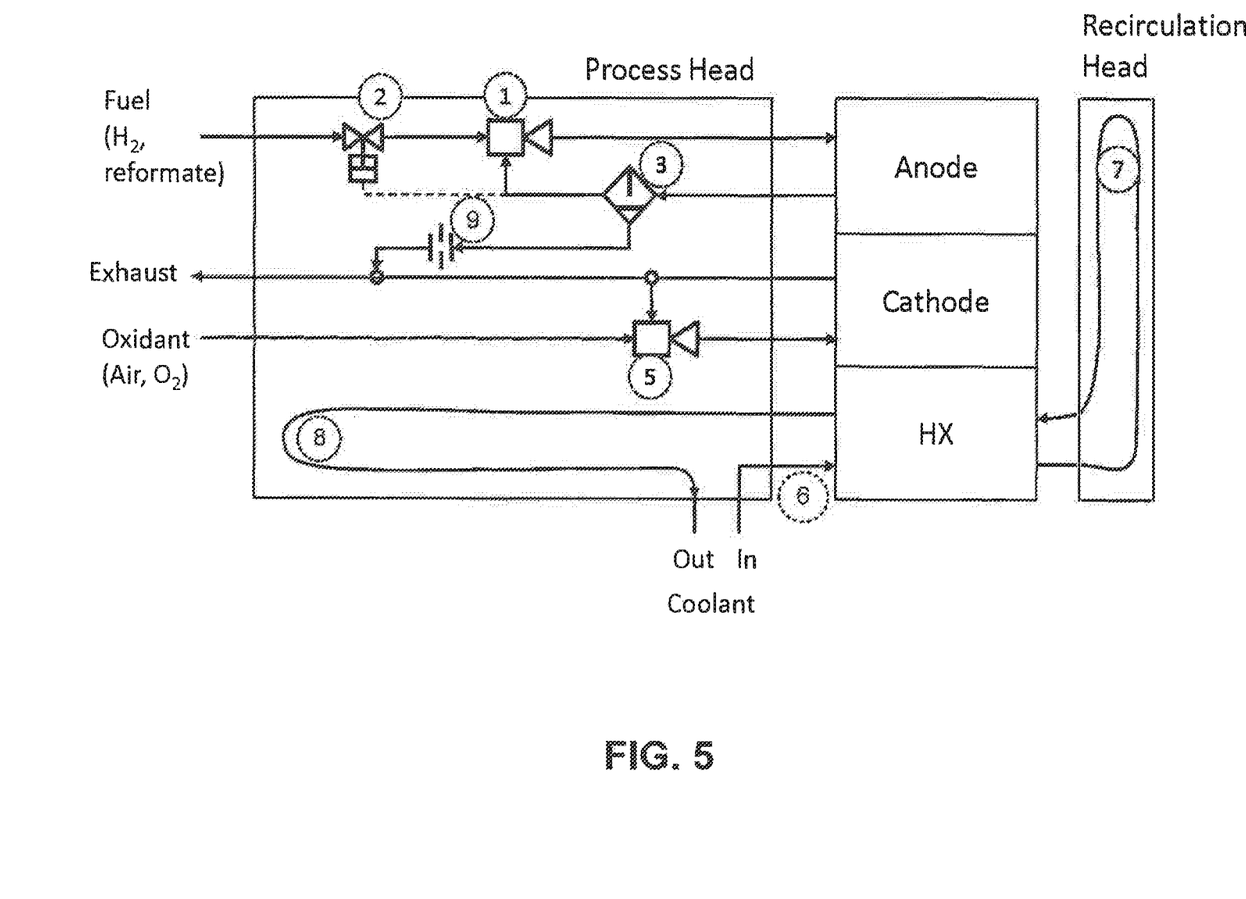
FIG. 5 is a schematic illustration of an embodiment of a fuel cell system according to this disclosure.

In the system of FIG. 5, instead of an anode purge control valve (4), an anode purge orifice plate (9) is used. This allows constant purging of anode exhaust to avoid accumulation of water and/or inert gas.

Figure 6:
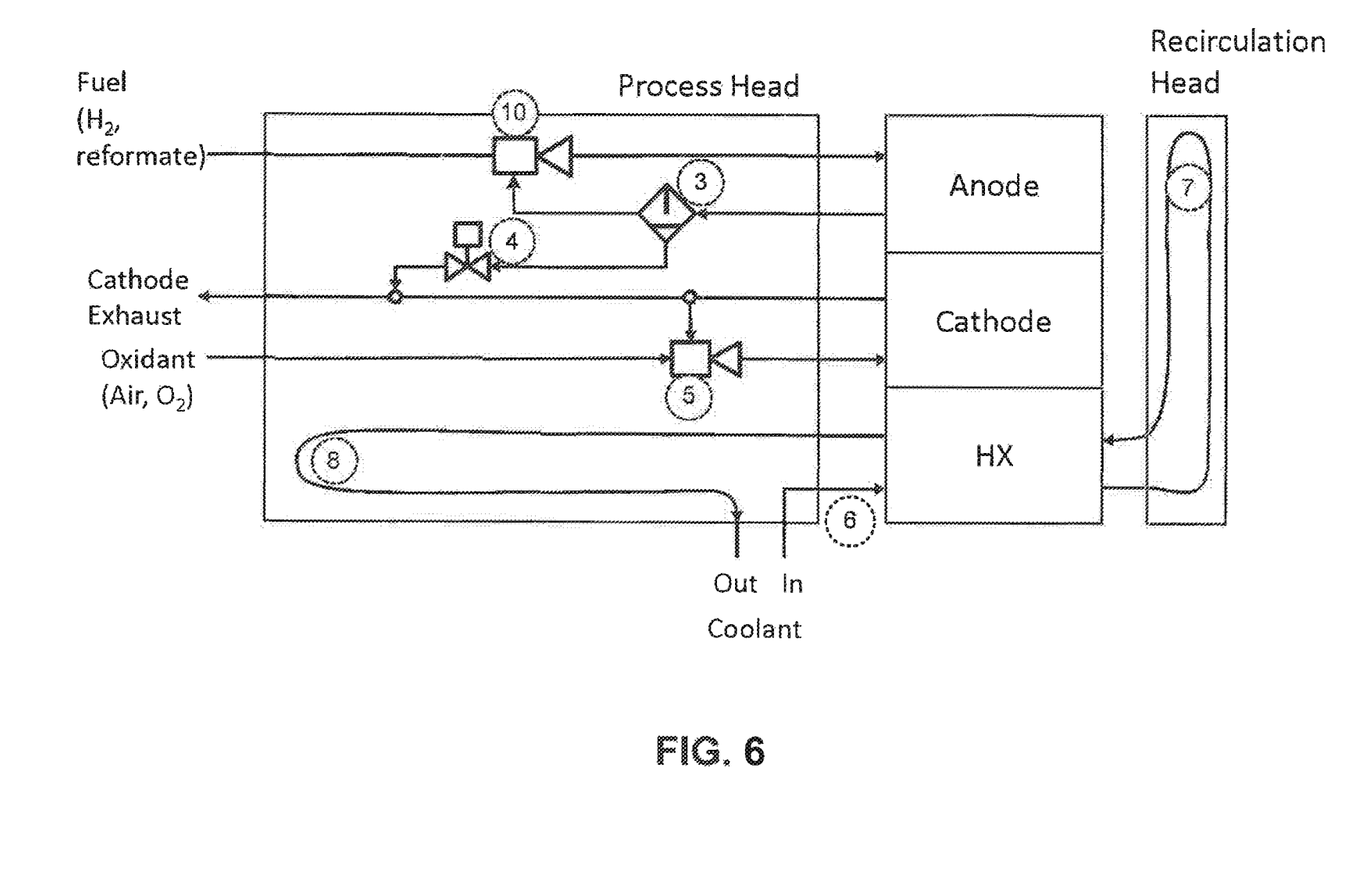
FIG. 6 is a schematic illustration of an embodiment of a fuel cell system according to this disclosure.

FIG. 6 discloses yet another embodiment of the fuel cell systems. Compared with the embodiment in FIG. 1, the control valve (2) and the ejector (1) are replaced by an integrated gas injector (10).

Figure 8:
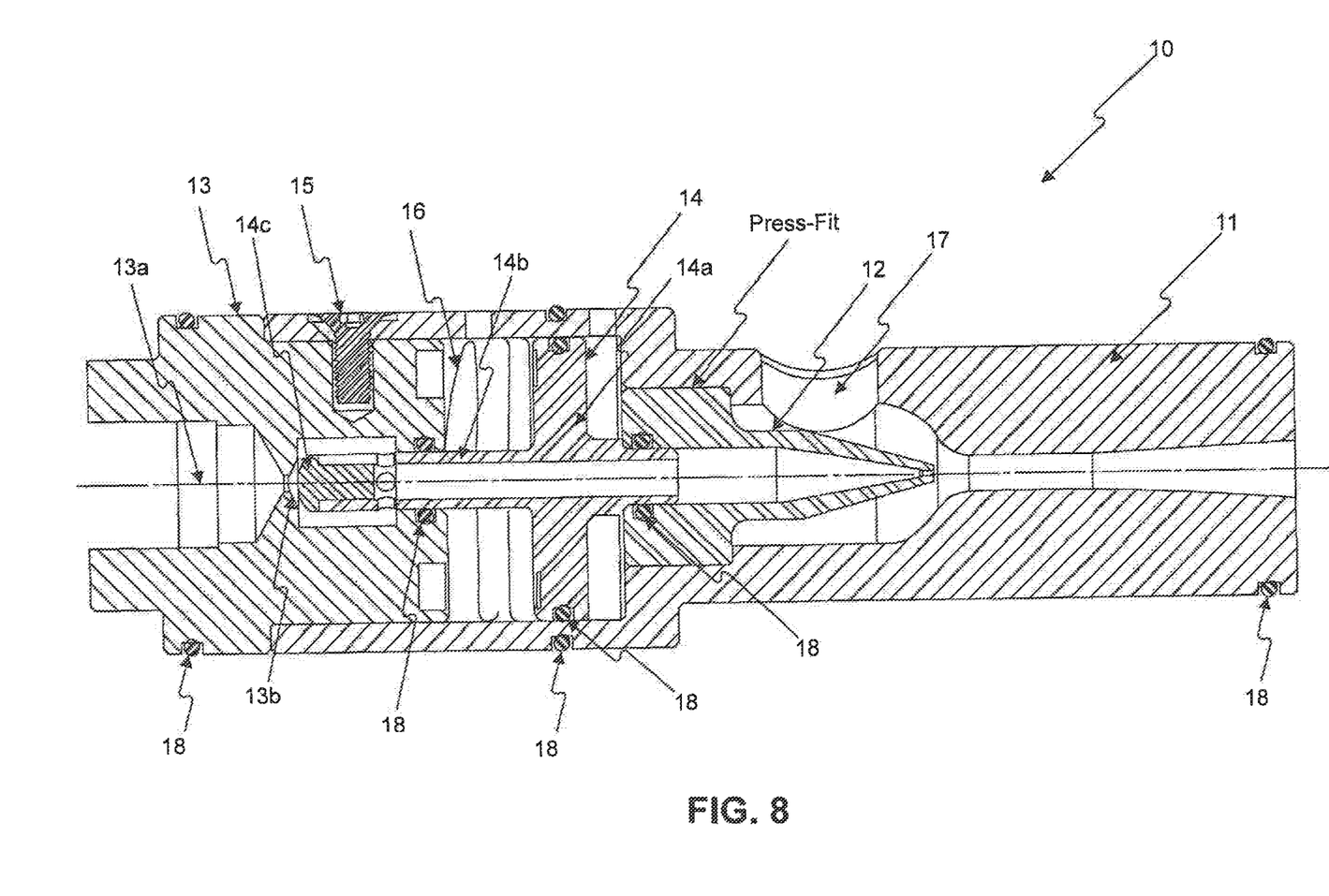
FIG. 8 is a drawing for an integrated gas ejector according to this disclosure.

An example of the ejector (10) is illustrated in FIG. 8. It comprises a gas inlet block (13) having an motive gas inlet (13*a*) and a cone-shaped valve seat (13*b*). It also comprises a piston (14), which has a piston disk (14*a*), a hollow valve stem (14*b*) with a cone-shaped tip (14*c*). The tip (14*c*) has a surface that can form a seal with the valve seat (13*b*). The ejector also comprises a gas nozzle (12) and a Venturi tube (11). The gas nozzle (12) is inserted into the Venturi tube (11), with the tip of nozzle placed near the throat of the Venturi tube (11). The Venturi tube (11) and the gas inlet block (13) is affixed together using a screw (15). O-rings (18) provide seals around various movable parts.

A spring (16) is placed on the motive gas inlet side of the piston disk (i.e., the side that is closer to the motive gas inlet), exerting a force on the piston disk when compressed. The spring (16) can be any type of spring, such as a wave spring produced by Smalley Steel Ring Co. of Lake Zurich, Ill.

The outlet side of the piston disk (i.e., the side that is further away from the motive gas inlet) is exposed to the mixture of the motive gas and the suction gas (i.e., the anode feed gas). The anode feed gas exerting a second force on the outlet side of the piston disk. When the force on the motive gas inlet side of the piston disk is lower than the force on the outlet side of the piston disk, the piston is pushed against valve seat (13*b*) so that the cone-shaped tip (14*c*) seals the valve seat (13*b*), blocking the motive gas inlet. When the anode gas pressure is at or above a set value, no fuel gas is introduced into the ejector.

Nevertheless, when a fuel cell is in operation and an electrical current is drawn from it, the anode gas is consumed in the fuel cell and its pressure decreases over time.

When the anode gas pressure drops below a set value, the force exerted on the piston disk (14a) by the anode gas becomes lower than the force exerted by the spring (16). When this occurs, the spring (16) pushes the piston (14) away from the valve seat (13b), opening the motive gas inlet. Consequently, the fuel gas flows through hollow valve stem (14b) and ejects out from nozzle (12) toward the throat in the Venturi tube, creating a low pressure zone near the throat of the Venturi tube.

The suction gas inlet (17) is an opening in the wall of the Venturi tube near the low pressure zone. The suction gas, e.g., the anode exhaust gas from the water separator (3), flows into the ejector and mixes with the fuel gas to form the anode feed gas. The anode feed gas then flows out from the ejector (10) into the fuel cell anode.

The disclosed Process Head or Recirculation Head may act as compression plates that are adjacent to and apply compression pressure to a fuel cell or a fuel cell stack. In a further embodiment, the fuel cell stack can have one or more separate compression plates. The compression plate has built in holes or channels that are aligned with conduits in the fuel cell, the Process Head, and/or the Recirculation Head when installed. The Process Head or Recirculation Head is affixed onto the compression plate using bolts, clamps, or other known fastening means.

Figure 7A:
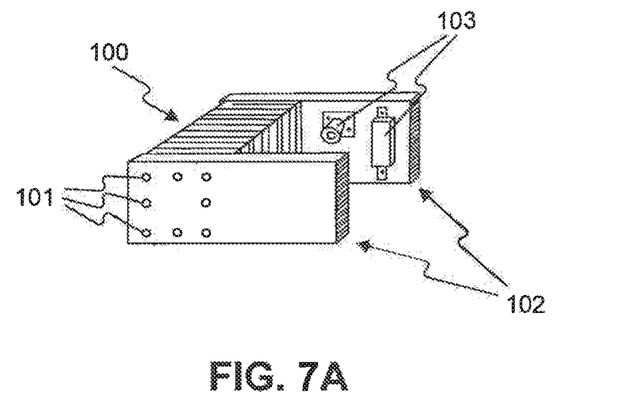
FIG. 7A illustrates an embodiment of fuel cell endplates according to this disclosure.
Figure 7B:
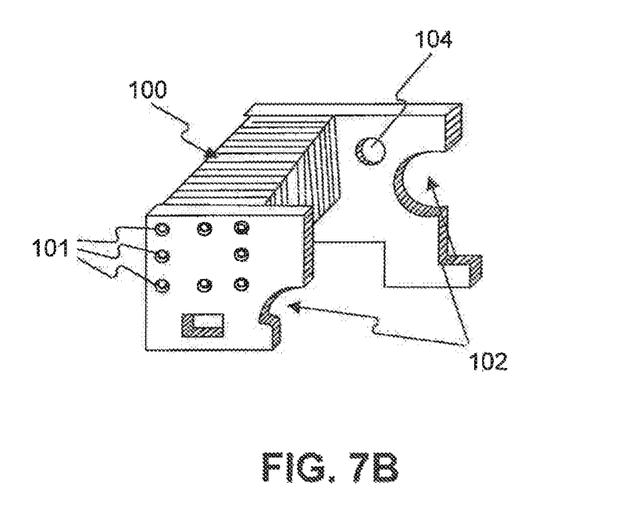
FIG. 7B illustrates an embodiment of fuel cell endplates according to this disclosure.
Figure 7C:
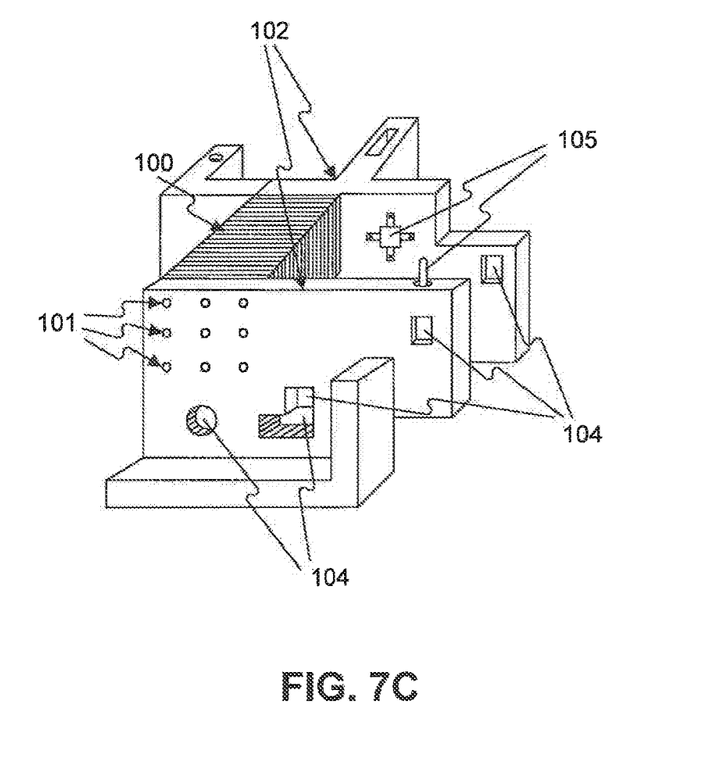
FIG. 7C illustrates an embodiment of fuel cell endplates according to this disclosure.

Additional embodiments of the endplate are illustrated in FIGS. 7A-C, in which the endplate is extended to provide additional structural or process functionality for the fuel cell or a system into which the fuel cell is integrated. For example, the endplates (102) in FIG. 7A have ports for tie rods (101) that are used to compress the fuel cell stack (100). The endplates may have built-in channels (not shown) for the anode feed gas, the cathode feed gas, as well as anode exhaust and cathode exhaust, coolant inlet and outlet, etc. They may have built-in ports for mounting gas-handling system components (103) such as valves, a water separator, or a gas blower or a compressor.

The fuel cell endplates (102) for the same fuel cell stack (100) can be matched, meaning that the endplates are generally of the same shape or dimension (see FIG. 7A), or unmatched, meaning that the endplates are of different shapes or dimensions (see FIG. 7B). The endplates may have cutouts or through holes (104) that accommodate other components and/or to abide packaging constraints. The endplates may be uniform or have a variable cross-sectional thickness. Furthermore, as shown in FIG. 7C, the end plates can adopt different shapes and extend in different directions to accommodate system components of different sizes and shapes. The end plate further comprises brackets or pins (105) for mounting system components.

In further embodiments, additional components, such as control electronics can also be mounted on the endplates, and/or passages for wiring can be built into the endplates.

It will be apparent to those skilled in the art that various modifications and variations can be made without departing from the spirit of the invention. The present invention covers all such modifications and variations, provided they come within the scope of the claims and their equivalents.

We claim:

1. A method for recirculating an anode exhaust into a fuel cell stack, the method comprising:
   directing the anode exhaust from the fuel cell stack to a suction gas inlet of a gas ejector;
   directing a fuel gas to a motive gas inlet of the gas ejector, the gas ejector comprising:
      a nozzle with a tip positioned at a throat of a venturi tube, wherein the nozzle is configured to eject fuel gas into the venturi tube where the fuel gas mixes with anode exhaust to form a gas mixture;
      a piston slideably positioned within the gas ejector, wherein the piston is configured to control the flow of fuel gas through the nozzle based on a pressure of the anode exhaust directed through the suction gas inlet; and
      a hollow valve stem fixed to the piston that fluidly connects the motive gas inlet to the nozzle, wherein the hollow valve stem has a cone-shaped valve tip and the motive gas inlet has a cone-shaped valve seat configured to receive the cone-shaped valve tip;
   directing the gas mixture from the venturi tube to an anode feed gas inlet of the fuel cell stack.

2. The method of claim 1, wherein the gas ejector further comprises a spring, the spring exerts a first force on the piston that opposes a second force created by the pressure of the anode exhaust on the piston.

3. The method of claim 2, wherein the piston slides toward the nozzle when the first force is greater than the second force.

4. The method of claim 2, wherein the piston slides away from the nozzle when the first force is less than the second force.

5. The method of claim 1, further comprising separating at least a portion of water within the anode exhaust using a water separator before directing the anode exhaust to the suction gas inlet of the gas ejector.

* * * * *